United States Patent [19]

Watanabe

[11] Patent Number: 5,586,056
[45] Date of Patent: Dec. 17, 1996

[54] REMOTE MONITORING SYSTEM USING A POLLING LEVEL TABLE AND A MONITORED STATION NUMBER TABLE

[75] Inventor: Gaku Watanabe, Tokyo, Japan

[73] Assignee: NEC Corporation, Tokyo, Japan

[21] Appl. No.: 339,204

[22] Filed: Nov. 10, 1994

[30] Foreign Application Priority Data

Nov. 10, 1993 [JP] Japan .................................. 5-304687

[51] Int. Cl.⁶ .................................................. G01B 21/00
[52] U.S. Cl. ..................................... 364/550; 340/825.08
[58] Field of Search .................................. 364/550, 131, 364/483, 492; 340/825.08, 825.1–825.16; 379/92; 370/85.6–85.8, 92–95.2; 395/200

[56] References Cited

U.S. PATENT DOCUMENTS

| | | | |
|---|---|---|---|
| 4,385,382 | 5/1983 | Goss et al. | 340/825.5 |
| 4,466,001 | 8/1984 | Moore et al. | 340/825.08 |
| 4,598,363 | 7/1986 | Clark et al. | |
| 4,638,428 | 1/1987 | Gemma et al. | |
| 4,683,531 | 7/1987 | Kelch et al. | 395/200 |
| 4,829,297 | 5/1989 | Ilg et al. | 340/825.08 |
| 5,061,922 | 10/1991 | Nishijima et al. | 340/825.08 |
| 5,101,199 | 3/1992 | Suzuki | 340/825.08 |
| 5,130,983 | 7/1992 | Heffner, III | 370/85.8 |
| 5,132,680 | 7/1992 | Tezuka et al. | 340/825.08 |
| 5,333,286 | 7/1994 | Weinberger et al. | 395/500 |
| 5,347,515 | 9/1994 | Marino | 370/85.2 |
| 5,461,570 | 10/1995 | Wang et al. | 364/131 |

FOREIGN PATENT DOCUMENTS

| | | |
|---|---|---|
| 2270426 | 5/1990 | Japan . |
| 475146 | 3/1992 | Japan . |

OTHER PUBLICATIONS

IBM Technical Disclosure Bulletin, vol. 20, No. 2, Jul. 1977, pp. 773–774, R. W. Farr et al., "Dynamically Optimized polling System".
Patent Abstracts Of Japan, vol. 16, No. 286, 25 Jun. 1992.

*Primary Examiner*—James P. Trammell
*Attorney, Agent, or Firm*—Sughrue, Mion, Zinn, Macpeak & Seas

[57] ABSTRACT

A data transmitter/receiver of a centralized monitoring station transmits data and receives data from each of monitored stations. A polling level table stores polling levels calculated from request data level and transmission data level added to transmission data from the monitored stations. A monitored station number table stores the numbers of monitored stations to be polled with a polling-level equal to or greater than 2 in one polling cycle. A polling level determining unit determines polling levels to be transmitted to the respective monitored stations based on the contents of the polling level table and the monitored station number table. A data transmitter/receiver of each of the monitored stations transmits transmission data level corresponding to the polling level and transmission data with the added request data level to the centralized monitoring station.

3 Claims, 6 Drawing Sheets

FIG.2
| MONITORED STATION No. | POLLING LEVEL (Lmr) |
|---|---|
| 1 | 1 |
| 2 | 3 |
| 3 | 2 |
| ⋮ | ⋮ |
| N | 1 |
FIG.3A
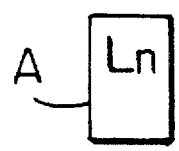
FIG.3B
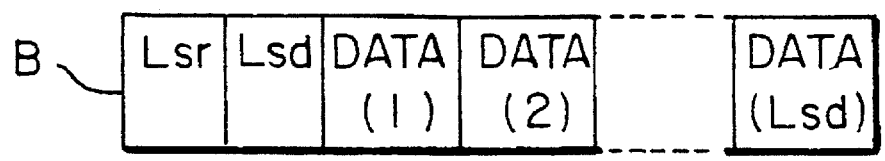

OPERATION OF THE
CENTRALIZED MONITORING STATION

```
    Ln            Lsr Lsd DATA
    1             1   1   1
```

S1 — CHANGE IN LEVEL OF THE MONITORED STATION
Lsr = 1 → Lsr = 2

```
    Ln            Lsr Lsd DATA DATA
    1             2   2   1    2
```

S2

S3 — Lsd = Lsr = 2 FROM Lsr ≧ Ln+1 AND Lsr = 1 AFTER THE COMPLETION OF TRANSMISSION

S4 — Lmr = 1 FROM Lsr = Lsd

```
    Ln            Lsr Lsd DATA
    1             1   1   1
```

OPERATION OF THE
MONITORED STATION

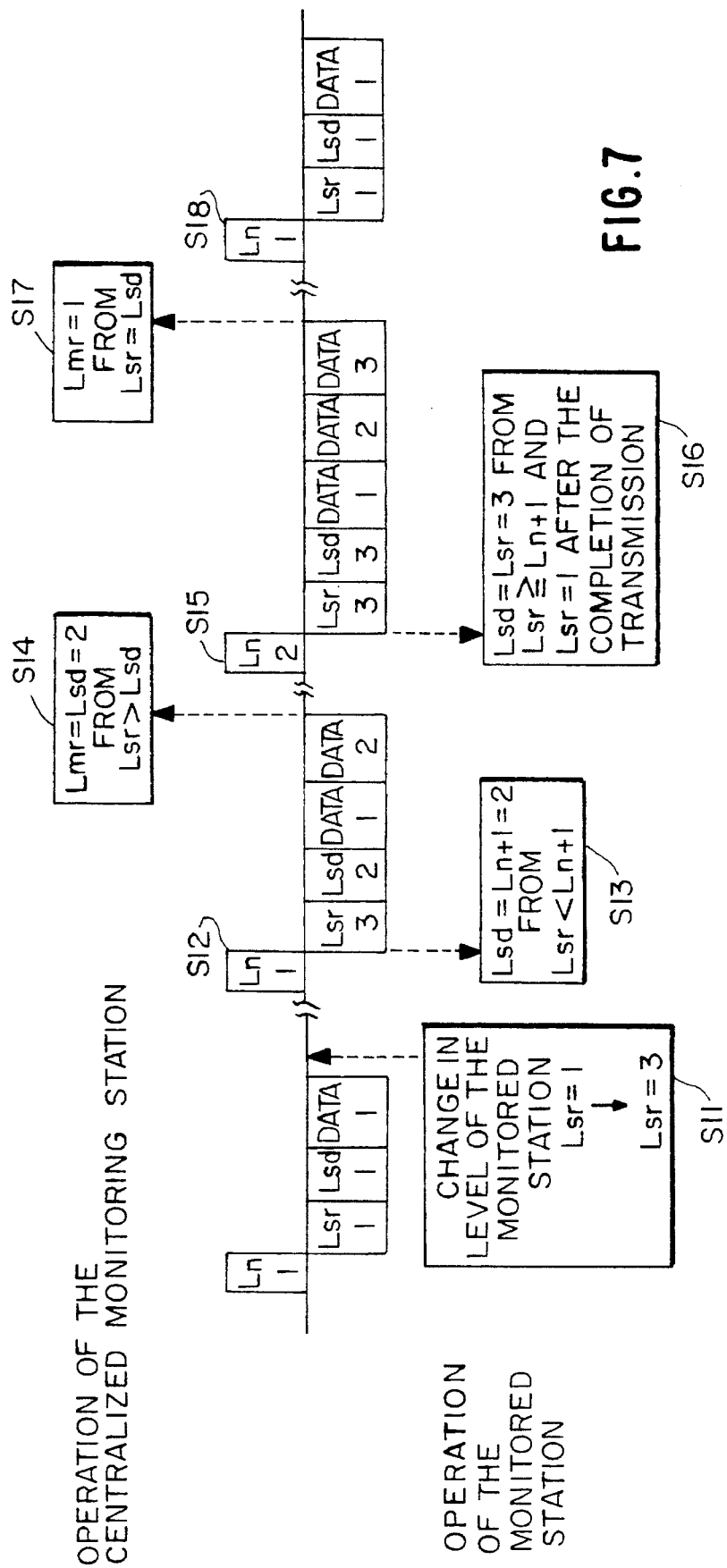

REMOTE MONITORING SYSTEM USING A POLLING LEVEL TABLE AND A MONITORED STATION NUMBER TABLE

BACKGROUND OF THE INVENTION

1. Field of the Invention

The present invention relates to a remote monitoring system, and more particularly to a remote monitoring system having a centralized monitoring station for collecting data from a plurality of monitored stations that are connected to a bus network.

2. Description of the Prior Art

Conventional remote monitoring systems employ a polling process as a data collecting process for requesting all monitored stations to transmit data. In such a polling process, all the monitored stations are polled in the same manner irrespective of the condition of the monitored stations.

The time established by the remote monitoring system to collect data from all the monitored stations is determined by the sum of times required to collect data from the individual monitored stations. If the proportion of data of less importance is large in the amount of data to be transmitted from the monitored stations and if there is even one monitored station which transmits a large amount of data, then the remote monitoring system needs a long period of time to collect the data.

Various data collecting systems have been proposed to solve the above problem. For example, Japanese patent laid-open No. 270426/90 discloses a communication control system in which monitoring information is given preferential ranking, and stored in a plurality of registers according to the given preferential ranking, so that emergency information can be transmitted and received more quickly than the other information.

Japanese patent laid-open No. 75146/92 discloses a centralized monitoring control system in which each monitored station is polled for confirming an amount of data to be transmitted therefrom, and the number of times that each monitored station is to be polled is determined on the basis of the result of polling.

The communication control system disclosed in the former publication is disadvantageous because it fails to handle any monitor information which is given priority ranking in excess of the number of transmission and reception registers that are installed.

The centralized monitoring control system disclosed in the latter publication also has a problem in that it requires an extra period of time to effect polling on all the monitored stations to check the amount of data to be transmitted therefrom.

SUMMARY OF THE INVENTION

It is therefore an object of the present invention to provide a remote monitoring system capable of collecting data efficiently by preferentially handling data of greater importance.

To achieve the above object, there is provided in accordance with the present invention a remote monitoring system comprising a plurality of monitored stations connected to a bus network, and a centralized monitoring station for collecting data from the plurality of monitored stations, each of the monitored stations comprising status/alarm detecting means for detecting a status and an alarm in the monitored station itself, condition memory means for storing a condition of the monitored station itself from the detected status and the detected alarm, level setting means for setting a request data level for transmission data of the monitored station itself based on the stored condition of the monitored station itself, and data transmitting/receiving means responsive to a data transmission request from the centralized monitoring station for updating the tranmission data level of the monitored station itself, and transmitting the transmission data level and transmission data having the transmission data level to the centralized monitoring station, the centralized monitoring station comprising data transmitting/receiving means for transmitting data to and receiving data from the monitored stations, a polling level table for holding polling levels corresponding to the monitored stations, respectively, calculated from the transmission data level of the transmission data from each of the monitored stations and the request data level belonging to each monitored stations, a monitored station number table for holding the number/numbers of a monitored station/stations to be polled with a polling level equal to or lowerer than the second highest level in one polling cycle, polling level determining means for determining polling levels to be transmitted to the monitored stations based on contents of the polling level table and the monitored station number table, and level rewriting means for rewriting the polling levels in the polling level table based on the transmission data level of the transmission data received from each of the monitored stations and the polling level determined by said polling level determining means.

Data of greater importance can be collected preferentially by varying the polling levels to be transmitted from the centralized monitoring station to the monitored stations depending on request data levels owned by the respective monitored stations on the network.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 2 is a diagram of a polling table in the remote monitoring system;

FIGS. 3A and 3B are diagrams showing formats of data transmitted and received between a centralized monitoring station and monitored stations of the remote monitoring system;

FIG. 6 is a diagram showing a time sequence at the time the request data level of a monitored station varies; and FIG. 7 is a diagram showing another time sequence at the time the request data level of a monitored station varies.

DETAILED DESCRIPTION OF THE PREFERRED EMBODIMENT

Figure 1:
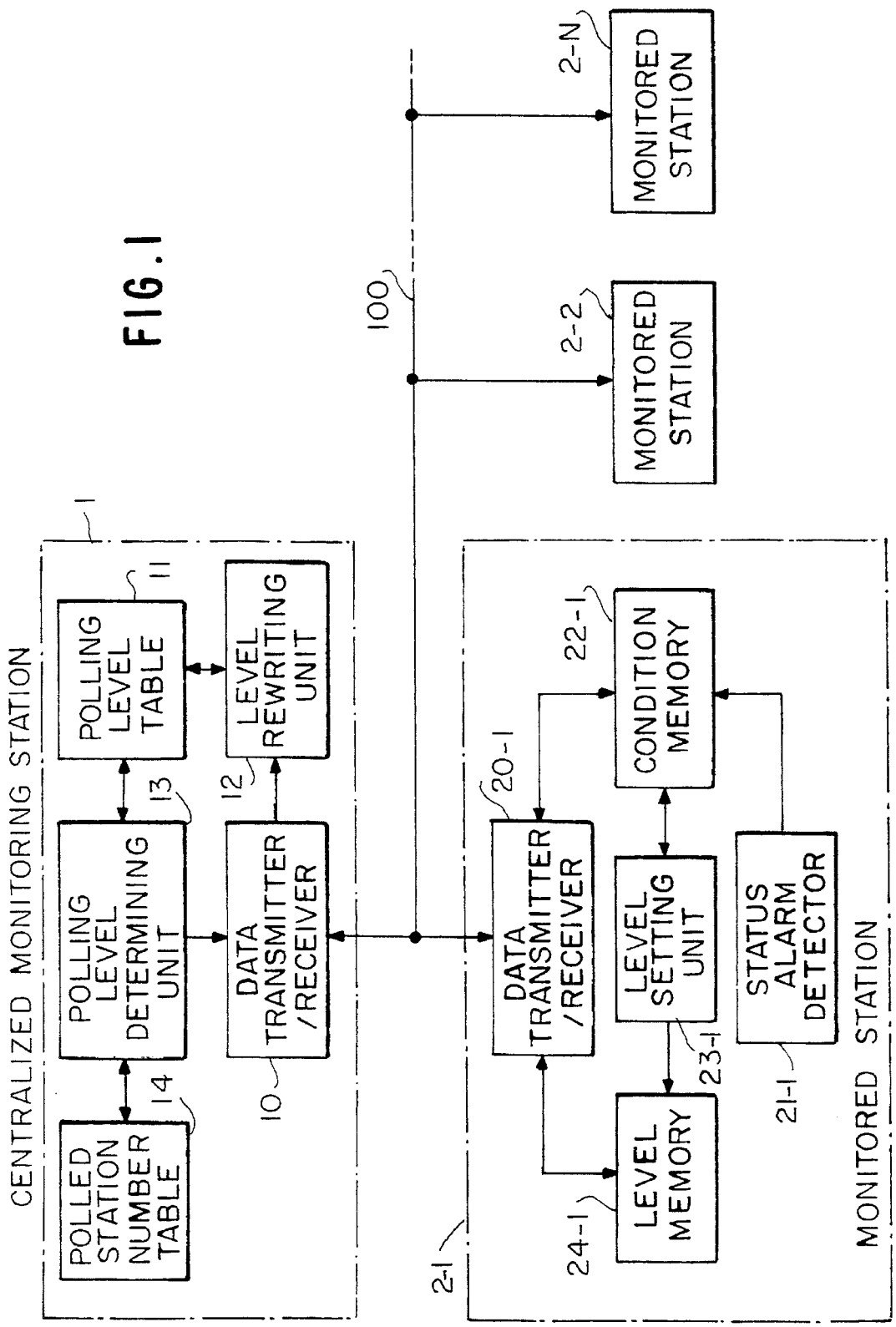
FIG. 1 is a block diagram of a remote monitoring system according to the present invention.

As shown in FIG. 1, a remote monitoring system according to the present invention comprises a plurality of monitored stations 2-1, 2-2, , 2-N on a network and a centralized monitoring station 1 for monitoring the monitored stations 2-1, 2-2, , 2-N.

The centralized monitoring station 1 comprises a data transmitter/receiver 10 for transmitting data to and receiving data from the monitored stations 2-$i$ ($i$=1~N), a polling level table 11 for holding polling levels corresponding to the respective monitored stations 2-$i$, a monitored station number table 14 for holding the number/numbers of a monitored station/stations to be polled with a polling level equal to or greater than 2 in one polling cycle, a level rewriting unit 12 for rewriting the contents of the polling level table 11 based on data received from the monitored stations 2-$i$, and a polling level determining unit 13 for determining polling levels to be transmitted to the monitored stations 2-$i$ based on the contents of the polling level table 11 and the monitored station number table 14.

The monitored station 2-1 comprises a data transmitter/receiver 20-1 for transmitting data to and receiving data from the centralized monitoring station 1, a status/alarm detector 21-1 for detecting a status and an alarm in the monitored station 2-1 itself, a condition memory 22-1 for storing the condition of the monitored station 2-1 itself, a level setting unit 23-1 for setting a request data level for transmission data of the monitored station 2-1 itself based on the content of the condition memory 22-1, and a level memory 24-1 for storing transmission data levels and request data level for transmission data. The other monitored stations 2-2~2-N are identical in structure to the monitored station 2-1.

It is assumed that a transmission data level of transmission data received from each of the monitored stations 2-$i$ ($i$=1~N) is represented by Lsd, a request data level indicative of the transmission data level of transmission data held by each of the monitored stations 2-$i$ is represented by Lsr, a polling level transmitted to each of the monitored stations 2-$i$ is represented by Ln, and a polling level stored in the polling level table 11 is represented by Lmr.

The value of the transmission data level Lsd is equal to 1 when it is of a highest level, and becomes greater than 1 as the level becomes lowerer. This holds true for the values of Lsr, Ln, Lm and Lmr.

The polling level table 11 stores polling levels Lmr that are calculated from transmission data levels Lsd and request data levels Lsr added to transmission data received from the monitored stations 2-$i$.

The data transmitter/receiver 10 adds a polling level Ln that has been determined based on the contents of the polling level table 11 and the monitored station number table 14 by the polling level determining unit 13, to a polling packet, and transmits the polling packet with the added polling level Ln to each of the monitored stations 2-$i$.

The polling level determining unit 13 determines from the polling level table 11 a monitored station/stations to be polled with a polling level equal to or greater than 2 in the next polling cycle, every time one polling cycle is completed. Specifically, in the case of one monitored station with a request data level equal to or greater than 2, the polling level determining unit 13 stores the number of the monitored station in the monitored station number table 14. In the case of a plurality of monitored stations with a request data level equal to or greater than 2, the polling level determining unit 13 inspects the request data level (=polling level) of the monitored station in the polling level table 11 from the monitored station next to the monitored station polled with a polling level equal to or greater than 2 in the preceding polling cycle and stores in the monitored station number table 14 the number of the monitored station with a request data level is equal to or greater than 2 which is first detected. If there is no monitored station polled with a polling level equal to or greater polling than 2 in the preceding polling cycle, the polling level determining unit 13 inspects the request data level of the monitored station in the polling level table 11 from the monitored station 2-1. If the monitored station polled with a polling level 2 in the preceding polling cycle is, for example, the monitored station 2-3, the polling level determining unit 13 inspects the request data level of the monitored station 2-4, 2-5, - - - , 2-N, 2-1 and 2-2 in this order.

The data transmitter/receiver 20-$i$ of each of the monitored stations 2-$i$ adds a request data level Lsr and a transmission data level Lsd to a response data packet, and transmits the response data packet with the added request data level Lsr and transmission data level Lsd to the centralized monitoring station 1. Specifically, upon reception of the polling packet with the polling level Ln from the centralized monitoring station 1, the data transmitter/receiver 20-$i$ transmits data from level 1 up to the transmission data level Lsd where Lsd=Lsr if Lsr≦Ln+1 and Lsd=Ln+1 if Lsr >Ln+1. At this time, the data transmitter/receiver 20-$i$ determines the request data level Lsr based on the content of the level memory 24-$i$, adds a request data level Lsr and a transmission data level Lsd to a response data packet, and transmits the response data packet with the added request data level Lsr and transmission data level Lsd to the centralized monitoring station 1.

Upon reception of the response data packet from each of the monitored stations 2-$i$, the level rewriting unit 12 compares the request data level Lsr and the transmission data level Lsd that have been added to the response data packet, and stores a polling level Lmr in the polling level table 11 where Lmr=1 if Lsr=Lsd and Lmr=Lsd if Lsr>Lsd.

In a next polling cycle, the centralized monitoring station 1 sends a data request to each of the monitored stations 2-$i$ with a polling level Ln that has been determined based on the polling level Lmr which has been stored in the polling level table 11 in the above process.

FIG. 2 shows an arrangement of the polling level table 11. As shown in FIG. 2, the polling level table 11 stores polling levels Lmr of "1", "2", "3", assigned respectively to the monitored station numbers 1~N of the respective monitored stations 2-$i$.

FIGS. 3A and 3B illustrate formats of data transmitted and received between the centralized monitoring station 1 and the monitored stations 2-$i$. FIG. 3A shows a polling packet A transmitted from the centralized monitoring station 1 to the monitored stations 2-$i$, and FIG. 3B shows a response data packet B transmitted from the monitored stations 2-$i$ to the centralized monitoring station 1.

As shown in FIG. 3A, the polling level Ln that has been determined by the polling level determining unit 13 is added to the polling packet A. As shown in FIG. 3B, the request data level Lsr and the transmission data level Lsd are added to data DATA(1)~DATA(Lsd) of the response data packet B which are transmitted to the centralized monitoring station 1.

Figure 4:
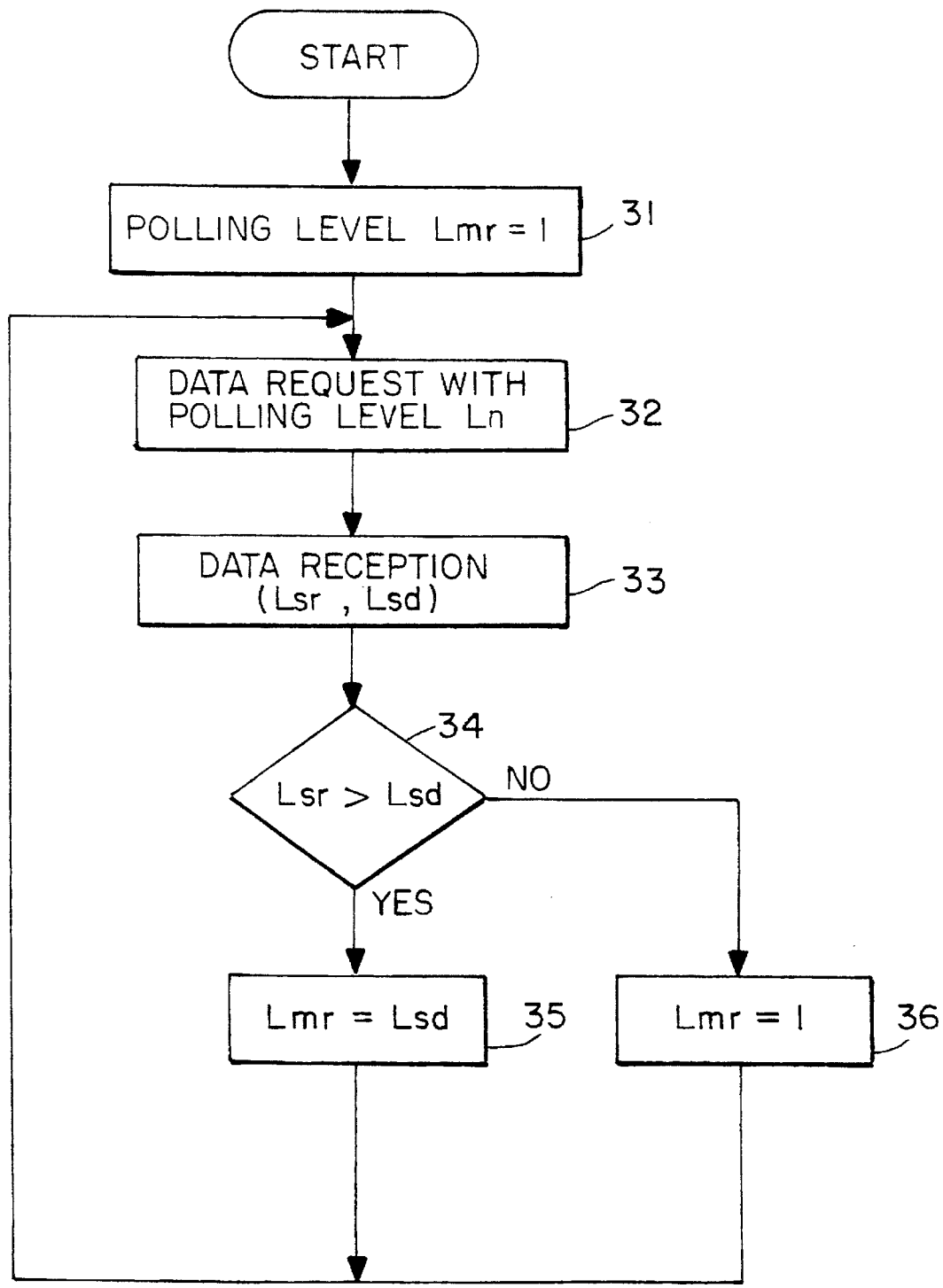
FIG. 4 is a flowchart of an operation sequence of the centralized monitoring station.
Figure 5:
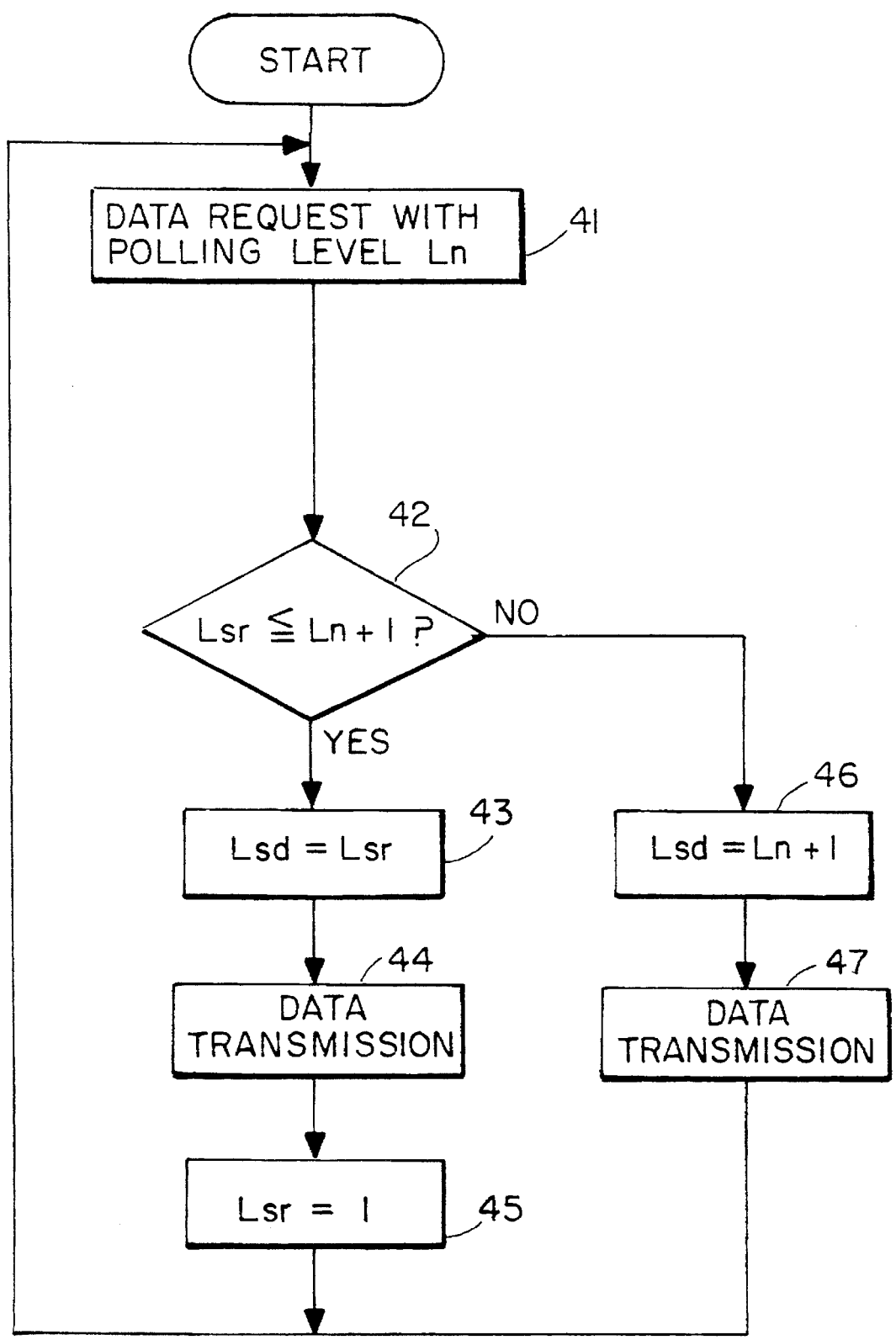
FIG. 5 is a flowchart of an operation sequence of each of the monitored stations.

FIG. 4 shows an operation sequence of the centralized monitoring station 1. FIG. 5 shows an operation sequence of each of the monitored stations 2-$i$. FIG. 6 shows a time sequence at the time the request data level Lsr of a monitored station 2-$i$ varies, and FIG. 7 shows another time sequence at the time the request data level Lsr of a monitored station 2-$i$ varies.

Operation of the remote monitoring system according to the present invention will now be described below with reference to FIGS. 1 through 7.

If the request data level Lsr of all the monitored stations 2-1~2-N is Lsr=1, then the polling level table 11 of the centralized monitoring station 1 stores a polling level Lmr=1 corresponding to each of the monitored stations 2-$i$ in a step 31 shown in FIG. 4.

If the centralized monitoring station 1 effects polling on all the monitored stations 2-1~2-N, then the data transmitter/receiver 10 adds a polling level Ln=1 determined based on the contents of the polling level table 11 by the polling level determining unit 13 to a polling packet A, and transmits the polling packet A with the added polling level Ln=1 to each of the monitored stations 2-$i$ in a step 32 shown in FIG. 4.

Upon reception of the polling packet A from the centralized monitoring station 1 in a step 41 shown in FIG. 5, the data transmitter/receiver 20-$i$ of each of the monitored stations 2-$i$ determines whether the request data level Lsr is Lsr≦Ln+1 or not in a step 42 shown in FIG. 5.

If Lsr≦Ln+1, then the data transmitter/receiver 20-$i$ sets a transmission data level Lsd to Lsd=Lsr in a step 43 shown in FIG. 5, adds a request data level Lsr and a transmission data level Lsd to the data from level 1 up to Lsd stored in the condition memory 22-$i$, and transmits the data with the added request data level Lsr and transmission data level Lsd as a response data packet B to the centralized monitoring station 1 in a step 44 shown in FIG. 5.

At this time, the data transmitter/receiver 20-$i$ resets all transmission data levels Lsd stored in the level memory 24-$i$, and sets a request data level Lsr to Lsr=1 in a step 45 shown in FIG. 5.

If Lsr is not equal to or smaller than Ln+1 in the step 42, then the data transmitter/receiver 20-$i$ sets a transmission data level Lsd to Lsd=Ln+1 in a step 46 shown in FIG. 5, adds a request data level Lsr and a transmission data level Lsd to the data stored in the condition memory 22-$i$ which correspond to the transmission data level up to Lsd=Ln+1, and transmits the data with the added request data level Lsr and transmission data level Lsd as a response data packet B to the centralized monitoring station 1 in a step 47 shown in FIG. 5.

Since the request data level Lsr of all the monitored stations 2-1~2-N is Lsr=1, the data transmitter/receiver 20-$i$ adds a request data level Lsr=1 and a transmission data level Lsd=Lsr=1 to the data of level 1 stored in the condition memory 22-$i$, and transmits the data with the added request data level Lsr and transmission data level Lsd as a response data packet B to the centralized monitoring station 1.

Upon reception of the response data packet B from the data transmitter/receiver 20-$i$ of each of the monitored-stations 2-$i$ in a step 33 shown in FIG. 4, the data transmitter/receiver 10 of the centralized monitoring station 1 outputs the request data level Lsr and the transmission data level Lsd that have been added to the response data packet B to the level rewriting unit 12.

The level rewriting unit 12 then determines whether the request data level Lsr received from the data transmitter/receiver 10 is greater than the transmission data level Lsd also received from the data transmitter/receiver 10 or not (Lsr>Lsd) in a step 34 shown in FIG. 4. If the request data level Lsr is greater than the transmission data level Lsd, then the level rewriting unit 12 writes a polling level Lmr as being equal to the transmission data level Lsd in the polling level table 11 in a step 35 shown in FIG. 4. If the request data level Lsr is not greater than the transmission data level Lsd, then the level rewriting unit 12 writes a polling level Lmr as Lmr=1 in the polling level table 11 in a step 36 shown in FIG. 4. Because the transmission data level Lsd=the request data level Lsr=1 in this case, the level rewriting unit 12 writes a polling level Lmr=1 in the polling level table 1.

If the stored content of the condition memory 22-1 of the monitored station 2-1 varies and the level setting unit 23-1 changes the request data level Lsr of the corresponding transmission data from Lsr=1 to Lsr =2 based on the content of the condition memory 22-1, then the level setting unit 23-1 writes a transmission data level Lsr=2 in the level memory 24-1.

The data transmitter/receiver 20-1 determines the request data level Lsr based on the stored content of the level memory 24-1 (see S1 in FIG. 6).

If the centralized monitoring station 1 effects polling on all the monitored stations 2-1~2-N at this time, then since the polling level Lmr in the polling level table 11 referred to by the polling level determining unit 13 is Lmr=1, the polling level determining unit 13 sets a polling level Ln to be transmitted to the monitored stations 2-$i$ to Ln=1 as with the value in the preceding cycle. The data transmitter/receiver 10 now effects polling on the monitored stations 2-$i$ with the polling level Ln=1 (see S2 in FIG. 6).

In the monitored station 2-1, since the polling level Ln is Ln=1 and the request data level Lsr is Lsr=2, the data transmitter/receiver 20-1 determines the request data level Lsr as Lsr=Ln+1, and the transmission data level Lsd and the request data level Lsr are set to Lsd=Lsr=2.

The data transmitter/receiver 20-1 reads transmission data with Lsd=2 from the condition memory 22-1, adds the request data level Lsr=2 and the transmission data level Lsd=2 to the transmission data, and transmits the transmission data with the added request data level Lsr=2 and transmission data level Lsd=2 as a response data packet B to the centralized monitoring station 1. Thereafter, the data transmitter/receiver 20-1 sets the request data level Lsr to Lsr=1 (see S3 in FIG. 6).

Upon reception of the transmission data from the monitored station 2-1, since the transmission data level Lsd added to the transmission data is Lsd=2 and the request data level Lsr added to the transmission data is Lsr=2, the level rewriting unit 12 of the centralized monitoring station 1 determines that the transmission data level Lsd and the request data level Lsr are equal to each other (Lsd=Lsr), and writes a polling level Lmr=1 in the polling level table 11 (see S4 in FIG. 6).

Therefore, the centralized monitoring station 1 will effect a next polling cycle based on the polling level Lmr=1 written in the polling level table 11 (see S5 in FIG. 6).

Now, it is assumed that, in the monitored station 2-1, the stored content of the condition memory 22-1 varies, and the level setting unit 23-1 changes the request data level-Lsr of the corresponding transmission data from Lsr=1 to Lsr=3 based on the content of the condition memory 22-1.

The data transmitter/receiver 20-1 determines the request data level Lsr based on the stored content of the level memory 24-1. When the stored content of the level memory 24-1 varies, the data transmitter/receiver 20-1 changes the request data level Lsr from Lsr=1 to Lsr=3 (see S11 in FIG. 7).

If the centralized monitoring station 1 effects polling on all the monitored stations 2-1~2-N, then since the polling level Lmr in the polling level table 11 referred to by the polling level determining unit 13 is Lmr=1, the polling level determining unit 13 sets a polling level Ln to be transmitted to the monitored stations 2-*i* to Ln=1 as with the value in the preceding cycle. The data transmitter/receiver 10 now effects polling on the monitored stations 2-*i* with the polling level Ln=1 (see S12 in FIG. 7).

In the monitored station 2-1, since the polling level Ln is Ln=1 and the request data level Lsr is Lsr=3, the data transmitter/receiver 20-1 determines the request data level Lsr as Lsr>Ln+1, and the transmission data level Lsd is set to Lsd=Ln +1=2 (see S13 in FIG. 7).

The data transmitter/receiver 20-1 reads transmission data with up to Lsd=2 from the condition memory 22-1, adds the request data level Lsr=3 and the transmission data level Lsd=2 to the transmission data, and transmits the transmission data with the added request data level Lsr=3 and transmission data level Lsd=2 as a response data packet B to the centralized monitoring station 1.

Upon reception of the transmission data from the monitored station 2-1, since the transmission data level Lsd added to the transmission data is Lsd=2 and the request data level Lsr added to the transmission data is Lsr=3, the level rewriting unit 12 of the centralized monitoring station 1 determines that the request data level Lsr is greater than the transmission data level Lsd (Lsr>Lsd), and writes a polling level Lmr=Lsd=2 in the polling level table 11 (see S14 in FIG. 7).

Therefore, the centralized monitoring station 1 will effect a next polling cycle based on the polling level Lmr=2 written in the polling level table 11 (see S15 in FIG. 7).

In the monitored station 2-1, since the polling level Ln is Ln=2 and the request data level Lsr is Lsr=3, the data transmitter/receiver 20-1 determines the request data level Lsr as Lsr=Ln+1, and the transmission data level-Lsd set to Lsd=Lsr=3.

The data transmitter/receiver 20-1 reads transmission data with up to Lsd=3 from the condition memory 22-1, adds the request data level Lsr=3 and the transmission data level Lsd=3 to the transmission data, and transmits the transmission data with the added request data level Lsr=3 and transmission data level Lsd=3 as a response data packet B to the centralized monitoring station 1. Thereafter, the data transmitter/receiver 20-1 sets the request data level Lsr to Lsr=1 (see S16 in FIG. 7).

Upon reception of the transmission data from the monitored station 2-1, since the transmission data level Lsd added to the transmission data is Lsd=3 and the request data level Lsr added to the transmission data is Lsr=3, the level rewriting unit 12 of the centralized monitoring station 1 determines that the transmission data level Lsd and the request data level Lsr are equal to each other (Lsd=Lsr), and writes a polling level Lmr=1 in the polling level table 11 (see S17 in FIG. 7).

Therefore, the centralized monitoring station 1 will effect a next polling cycle based on the polling level Lmr=1 written in the polling level table 11 (see S18 in FIG. 7).

Consequently, by varying the value of the polling level Ln determined by the polling level determining unit 13 depending on the polling level Lmr corresponding to each of the monitored stations 2-*i* which is calculated based on the request data level Lsr and the transmission data level Lsd added to the response data packet B from each of the monitored stations 2-*i* and is stored in the polling level table 11, it is possible to shorten the period of time required to collect high-level data in all the monitored stations 2-*i*.

Thus, data of greater importance can be collected preferentially, and hence can be collected efficiently.

Although a certain preferred embodiment of the present invention has been shown and described in detail, it should be understood that various changes and modifications may be made therein without departing from the scope of the appended claims.

What is claimed is:

1. A remote monitoring system comprising:
   a plurality of monitored stations connected to a bus network; and
   a centralized monitoring station for collecting data from said plurality of monitored stations;
   each of said monitored stations comprising status/alarm detecting means for detecting a status and an alarm in the monitored station itself, condition memory means for storing a condition of the monitored station itself from the detected status and the detected alarm, level setting means for setting a request data level for transmission data of the monitored station itself based on the stored condition of the monitored station itself, and data transmitting/receiving means responsive to a data transmission request from said centralized monitoring station for transmitting a transmission data level corresponding to the polling level from said centralized monitoring station and transmission data up to said transmission data level to said centralized monitoring station;
   said centralized monitoring station comprising data transmitting/receiving means for transmitting data to and receiving data from the monitored stations, a polling level table for holding polling levels corresponding to the monitored stations, respectively, calculated from the transmission data level of the transmission data from each of the monitored stations and the request data level belonging to each monitored stations, a monitored station number table for holding the number/numbers of a monitored station/stations to be polled with a polling level equal to or lowerer than the second highest level in one polling cycle, polling level determining means for determining polling levels to be transmitted to the monitored stations based on contents of the polling level table and the monitored station number table, and level rewriting means for rewriting the polling levels in said polling level table based on the transmission data level of the transmission data received from each of the monitored stations.

2. A remote monitoring system according to claim 1, wherein said data transmitting/receiving means of each of the monitored stations includes means for adding said request data level to said transmission data and transmitting the transmission data with the added request data level to said centralized monitoring station.

3. A remote monitoring system according to claim 1, wherein said data transmitting/receiving means of each of the monitored station includes means for lowering the next transmission data level from the polling level transmitted from said centralized monitoring station by one until the polling level becomes equal to the request data level of said monitored station, and means for updating said request data level with a highest level in a case where the transmission of all of the transmission data with data levels up to said request data level is to be completed by the data transmission this time, said level rewriting means of said centralized monitoring station includes means for rewriting the polling level of the monitored station with the transmission data level of the transmission data received from the monitored station when said transmission data level is higher than the request data level of said monitored station, and for setting the polling level of said monitored station to a initial value of the highest level when said transmission data level is equal to or lowerer than said request data level.

\* \* \* \* \*